(12) United States Patent
Nagasawa et al.

(10) Patent No.: US 10,480,438 B2
(45) Date of Patent: Nov. 19, 2019

(54) FUEL INJECTION CONTROL DEVICE FOR DIRECT INJECTION ENGINE

(71) Applicant: MAZDA MOTOR CORPORATION, Hiroshima (JP)

(72) Inventors: Takeshi Nagasawa, Hiroshima (JP); Keiji Araki, Hatsukaichi (JP); Noriyuki Ota, Hiroshima (JP); Kenji Uchida, Hiroshima (JP); Ryohei Ono, Hiroshima (JP); Kiyotaka Sato, Yokohama (JP); Hidefumi Fujimoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 219 days.

(21) Appl. No.: 15/557,987

(22) PCT Filed: Mar. 16, 2016

(86) PCT No.: PCT/JP2016/001513
§ 371 (c)(1),
(2) Date: Sep. 13, 2017

(87) PCT Pub. No.: WO2016/152102
PCT Pub. Date: Sep. 29, 2016

(65) Prior Publication Data
US 2018/0080401 A1    Mar. 22, 2018

(30) Foreign Application Priority Data
Mar. 23, 2015   (JP) ................. 2015-059858

(51) Int. Cl.
*F02D 41/06* (2006.01)
*F02D 41/04* (2006.01)
(Continued)

(52) U.S. Cl.
CPC ............ *F02D 41/06* (2013.01); *F02B 17/005* (2013.01); *F02B 23/101* (2013.01); *F02D 13/02* (2013.01);
(Continued)

(58) Field of Classification Search
CPC .... F02D 41/06; F02D 41/0002; F02D 41/402; F02D 41/024; F01D 41/401
See application file for complete search history.

(56) References Cited

U.S. PATENT DOCUMENTS

| 5,785,031 | A | * | 7/1998 | Akimoto | F02B 23/00 123/295 |
|---|---|---|---|---|---|
| 6,340,014 | B1 | * | 1/2002 | Tomita | F02D 41/024 123/295 |
| 2002/0187893 | A1 | * | 12/2002 | Yamada | B01D 53/9422 502/304 |
| 2005/0005900 | A1 | * | 1/2005 | Iriya | F02D 41/062 123/295 |
| 2017/0058793 | A1 | * | 3/2017 | Harada | F02M 61/1806 |

FOREIGN PATENT DOCUMENTS

| JP | S60-030440 A | 2/1985 |
|---|---|---|
| JP | H02-191849 A | 7/1990 |

(Continued)

OTHER PUBLICATIONS

International Search Report issued in PCT/JP2016/001513; dated Jun. 21, 2016.

*Primary Examiner* — Patrick D Maines
(74) *Attorney, Agent, or Firm* — Studebaker & Brackett PC

(57) ABSTRACT

Disclosed herein is a fuel injection control device for a direct injection engine including an engine body (engine 1) and a fuel injection control unit (engine controller 100). The fuel injection control unit injects a fuel in a predetermined injection mode into a combustion chamber (17) such that while the engine body is warm, an air-fuel mixture layer and a heat-insulating gas layer, surrounding the air-fuel mixture layer, are formed in the combustion chamber at a point in time when an air-fuel mixture ignites, and changes the injection mode of the fuel into the combustion chamber such that while the engine body is cold, the lower the temperature of the engine body is, the thinner the heat-insulating gas layer becomes.

10 Claims, 9 Drawing Sheets

(51) Int. Cl.
  *F02D 13/02* (2006.01)
  *F02D 21/08* (2006.01)
  *F02D 41/00* (2006.01)
  *F02D 41/02* (2006.01)
  *F02D 41/40* (2006.01)
  *F02B 17/00* (2006.01)
  *F02B 23/10* (2006.01)
  *F02D 41/38* (2006.01)

(52) U.S. Cl.
  CPC ......... *F02D 21/08* (2013.01); *F02D 41/0002* (2013.01); *F02D 41/024* (2013.01); *F02D 41/04* (2013.01); *F02D 41/068* (2013.01); *F02D 41/401* (2013.01); *F02D 41/402* (2013.01); *F02D 2041/389* (2013.01); *F02D 2200/021* (2013.01); *Y02T 10/125* (2013.01); *Y02T 10/44* (2013.01)

(56) References Cited

FOREIGN PATENT DOCUMENTS

| | | |
|---|---|---|
| JP | H09-041974 A | 2/1997 |
| JP | H10-212986 A | 8/1998 |
| JP | H11-294207 A | 10/1999 |
| JP | 2001-115885 A | 4/2001 |
| JP | 2006-336502 A | 12/2006 |
| JP | 2007-092633 A | 4/2007 |
| JP | 2009-185688 A | 8/2009 |
| JP | 2009-243355 A | 10/2009 |
| JP | 2010-285998 A | 12/2010 |
| JP | 2013-057266 A | 3/2013 |
| JP | 2013-155751 A | 8/2013 |
| JP | 2014-092123 A | 5/2014 |
| JP | 2015-169139 A | 9/2015 |

* cited by examiner

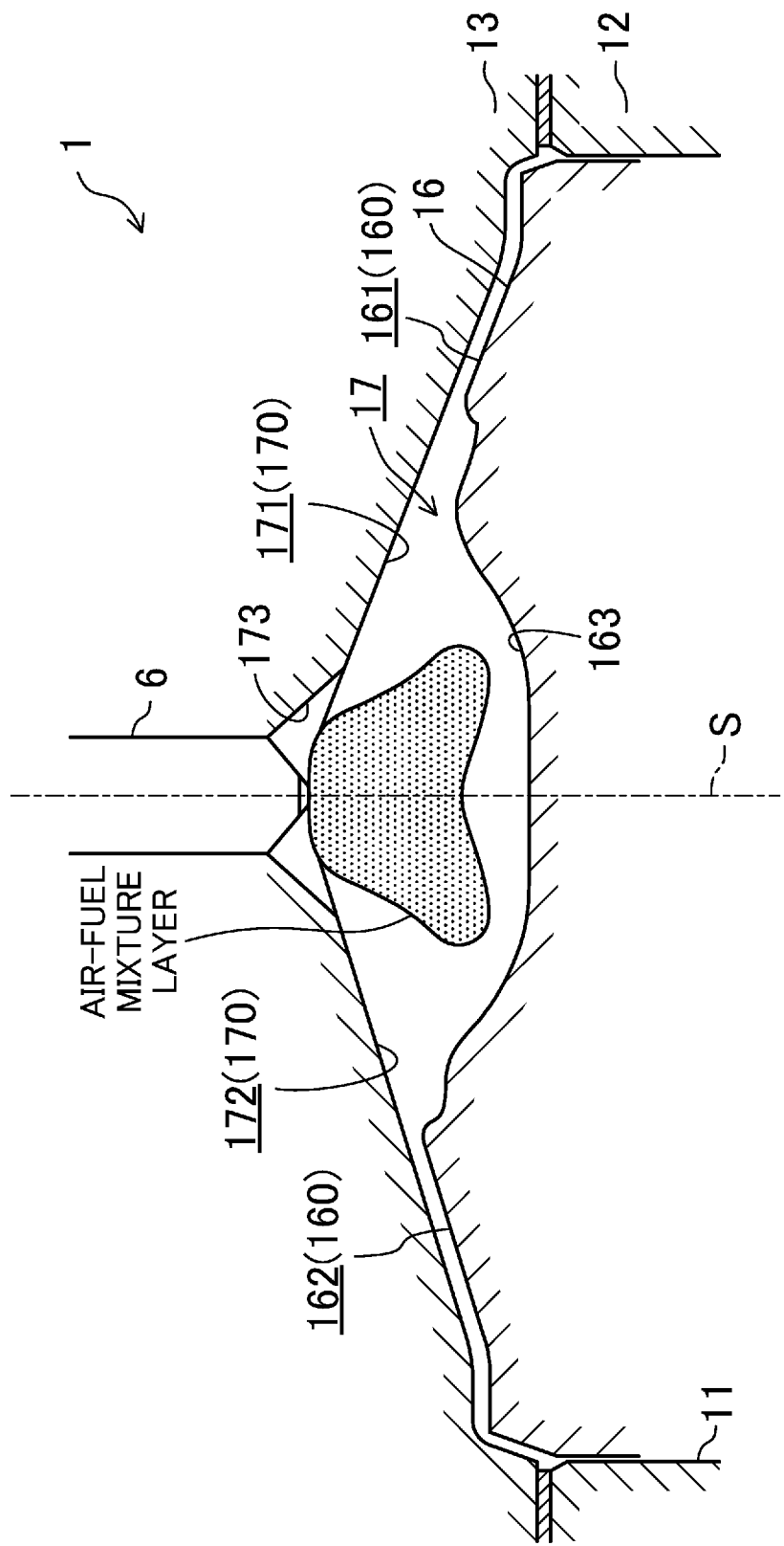

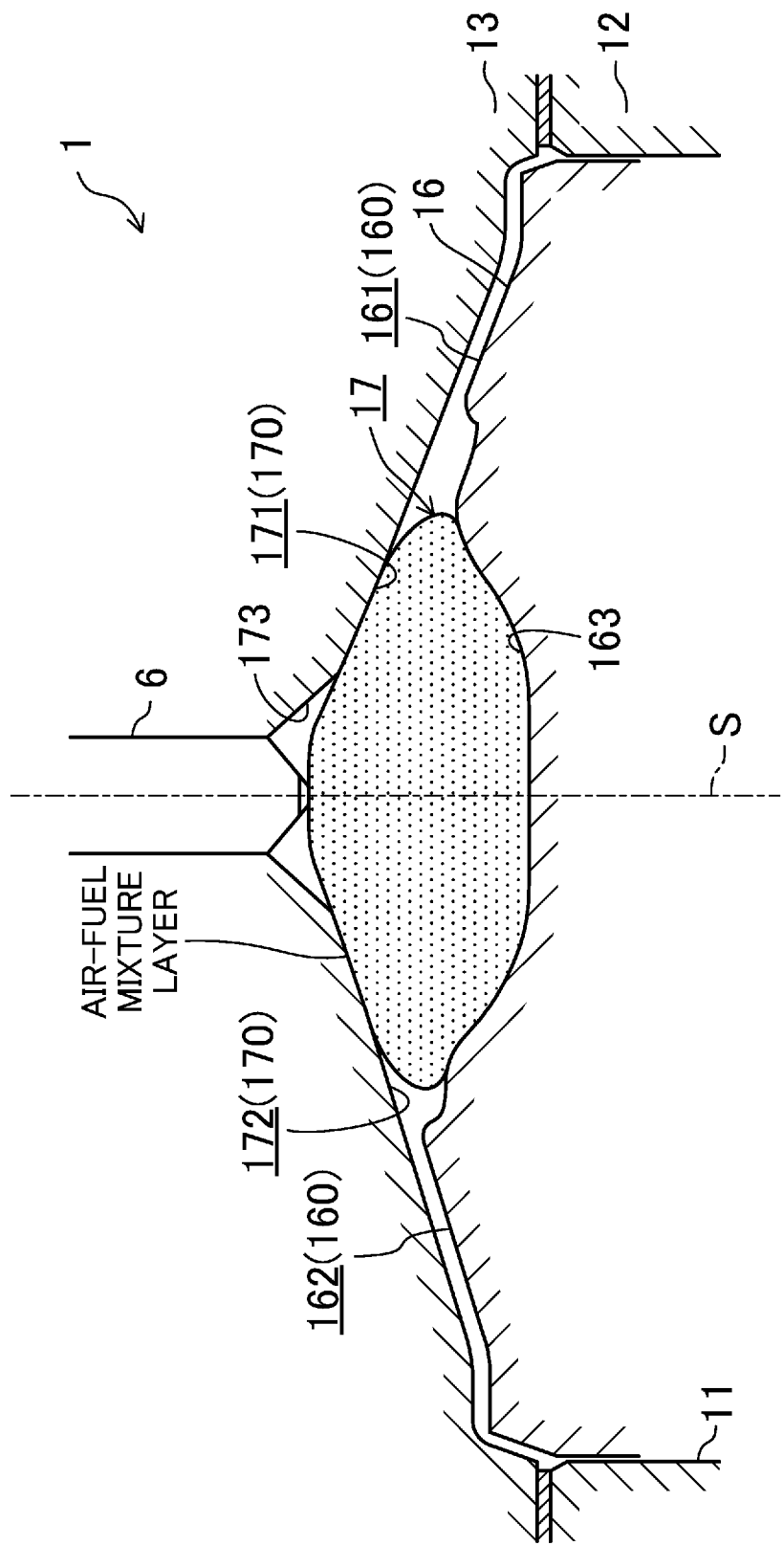

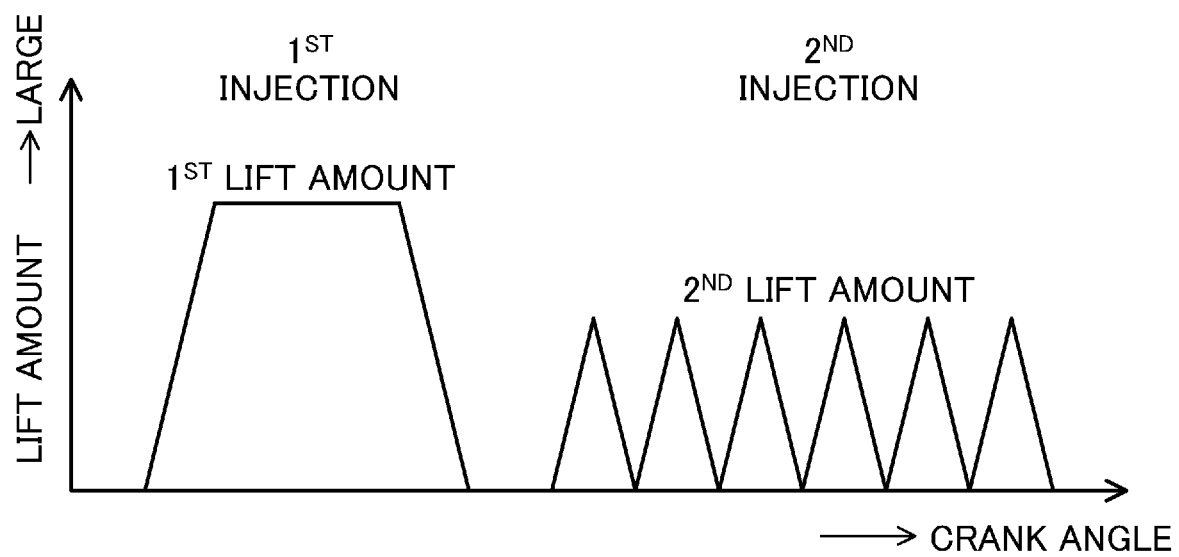

FUEL INJECTION CONTROL DEVICE FOR DIRECT INJECTION ENGINE

TECHNICAL FIELD

The present disclosure relates to a fuel injection control device for a direct injection engine.

BACKGROUND ART

Patent Document 1 discloses a direct injection engine having an outwardly-opening fuel injection valve arranged on the center axis of a cylinder, and injecting a fuel in the shape of a hollow cone. In this direct injection engine, the fuel is injected into the cylinder in the last stage of a compression stroke, thereby forming, in a combustion chamber, an air-fuel mixture layer and a gas layer around the air-fuel mixture layer. The engine disclosed in Patent Document 1 reduces the cooling loss by making the gas layer surrounding the air-fuel mixture serve as a heat-insulating layer during the combustion of the air-fuel mixture.

Patent Document 2 discloses a compression self-ignition engine in which a wall surface dividing a combustion chamber is made of a heat-insulating material to reduce cooling loss by the wall surface of the combustion chamber.

CITATION LIST

Patent Documents

Patent Document 1: Japanese Unexamined Patent Publication No. 2013-57266

Patent Document 2: Japanese Unexamined Patent Publication No. 2009-243355

SUMMARY

Technical Problem

Forming a heat-insulating gas layer around the air-fuel mixture layer as disclosed in Patent Document 1 is beneficial in reducing the cooling loss while the engine is warm. However, the heat-insulating gas layer also decreases the efficiency in the transfer of the heat during the combustion to the engine, thus causing a delay in warming the engine when the engine is cold.

In view of the foregoing background, it is therefore an object of the present disclosure to optimize the mode of combustion according to the temperature level of a direct injection engine designed to reduce the cooling loss by forming an air-fuel mixture layer and a heat-insulating gas layer in a combustion chamber.

Solution to the Problem

The present disclosure relates to a fuel injection control device for a direct injection engine. The device includes: an engine body including a combustion chamber defined by a cylinder head ceiling portion, a cylinder provided for a cylinder block, and a piston reciprocating inside the cylinder; and a fuel injection control unit which includes a fuel injection valve, provided inside the combustion chamber to inject a liquid fuel, and which is configured to inject the fuel into the combustion chamber at a predetermined timing.

The fuel injection control unit injects the fuel in a predetermined injection mode into a combustion chamber such that while the engine body is in a warm state where the temperature of the engine body has reached or exceeded a predetermined temperature, an air-fuel mixture layer and a heat-insulating gas layer, surrounding the air-fuel mixture layer, are formed in the combustion chamber at a point in time when an air-fuel mixture ignites, and changes the injection mode of the fuel into the combustion chamber such that while the engine body is in a cold state where the temperature of the engine body is less than the predetermined temperature, the lower the temperature of the engine body is, the thinner the heat-insulating gas layer becomes.

According to this configuration, the fuel is injected in a predetermined injection mode into a combustion chamber such that while the engine body is warm, an air-fuel mixture layer and a heat-insulating gas layer, surrounding the air-fuel mixture layer, are formed in the combustion chamber. The heat-insulating gas layer may consist essentially of air (i.e., fresh air) or may include a burned gas (i.e., an EGR gas) in addition to the air. There is no problem even if the heat-insulating gas layer includes a small amount of the fuel. Rather, the heat-insulating gas layer needs to be more fuel-lean than the air-fuel mixture layer so as to function as a heat insulating layer. When the air-fuel mixture burns, the heat-insulating gas layer is interposed between the air-fuel mixture layer and the wall surface of the combustion chamber, thus substantially preventing heat from being transferred from inside the combustion chamber onto the wall surface of the combustion chamber. This allows the cooling loss to be significantly reduced while the engine body is warm.

On the other hand, while the engine body is cold, the injection mode of the fuel into the combustion chamber is changed such that the heat-insulating gas layer becomes thinner. Thinning the heat-insulating gas layer includes eliminating the heat-insulating gas layer altogether. Thinning the heat-insulating gas layer weakens the heat insulation effect caused by the heat-insulating gas layer, thus transferring heat from inside the combustion chamber onto the wall surface of the combustion chamber. The lower the temperature of the engine body is, the thinner the heat-insulating gas layer becomes, and the more highly the transfer of heat from inside the combustion chamber onto the wall surface of the combustion chamber is promoted, which is advantageous in raising the temperature of the engine body. This promotes warming up the engine body in the cold state.

The fuel injection control device for the direct injection engine further includes a catalyst device arranged on an exhaust passage of the engine body and configured to purify an exhaust gas exhausted from the combustion chamber. The fuel injection control unit changes the injection mode of the fuel into the combustion chamber such that while the catalyst device is active and the engine body is cold, the lower the temperature of the engine body is, the thinner the heat-insulating gas layer becomes, and injects the fuel in a predetermined injection mode into the combustion chamber such that the heat-insulating gas layer becomes thicker while the catalyst device is inactive and the engine body is cold than while the catalyst device is active and the engine body is cold.

While the catalyst device is inactive, it is recommended that a higher priority be given to activating the catalyst device than warming up the engine body. Thus, according to the configuration described above, the fuel is injected in a predetermined injection mode into the combustion chamber such that the heat-insulating gas layer becomes thicker while the catalyst device is inactive and the engine body is cold than while the catalyst device is active and the engine body is cold. This allows the heat-insulating gas layer to fully exert its thermal insulation capability, thus reducing the transfer of heat from inside the combustion chamber onto the wall surface of the combustion chamber. Accordingly, as the transfer of heat is reduced, the thermal energy exhausted as an exhaust gas from the engine body can be increased, thus activating and raising the temperature of the catalyst device arranged on the exhaust passage of the engine body. That is to say, even while the engine body is cold, if the catalyst device is inactive, forming the heat-insulating gas layer in the combustion chamber effectively contributes to activating the catalyst device early.

On the other hand, while the catalyst device is active and the engine body is cold, the heat-insulating gas layer is thinned as described above. This can promote warming up the engine body.

In addition, while the engine body is warm, the heat-insulating gas layer is made thicker than while the engine body is cold. This contributes to reducing the cooling loss. Thus, if the engine body is started while the catalyst is inactive and the engine body is cold, first, the heat-insulating gas layer is thickened to attempt to activate the catalyst, and then thinned to promote warming up the engine body. Once the engine body has been warmed up, the heat-insulating gas layer will be thickened again to attempt to reduce the cooling loss.

The fuel injection control unit may retard an injection start timing of the fuel to a predetermined timing such that while the catalyst device is inactive and the engine body is cold, the heat-insulating gas layer thickens, and may advance the injection start timing of the fuel while the catalyst device is active and the engine body is cold with respect to the injection start timing while the catalyst device is inactive and the engine body is cold.

According to this embodiment, while the catalyst device is inactive and the engine body is cold, an injection start timing of the fuel is retarded to a predetermined timing. The injection start timing may be the second half of a compression stroke. As used herein, the "second half of the compression stroke" refers to the latter half when the compression stroke is evenly split into a first half and a second half. Retarding the injection start timing increases the pressure and temperature inside the cylinder when the injection is started. This can prevent the spray of the fuel injected into the combustion chamber from traveling longer than expected, thus avoiding a situation where the spray of the fuel contacts with the wall surface of the combustion chamber. Thus, the heat-insulating gas layer can be not only formed around the air-fuel mixture layer but also thickened as well. Note that as used herein, the combustion chamber is not limited to an in-cylinder space when the piston reaches the top dead center but may be a combustion chamber in a broader sense of the word, which is a space defined by the cylinder head ceiling portion and the piston, regardless of the piston's position. Thickening the heat-insulating gas layer reduces the transfer of heat from inside the combustion chamber onto the wall surface of the combustion chamber and raises the temperature of the exhaust gas exhausted from the engine body. This activates the catalyst device.

On the other hand, while the catalyst device is active and the engine body is cold, the fuel injection start timing is advanced with respect to the injection start timing while the catalyst device is inactive. This makes the pressure and temperature inside the cylinder relatively low when the fuel starts to be injected. This allows the spray of the fuel injected into the combustion chamber to reach the vicinity of the wall surface of the combustion chamber (note that deposition of liquid droplets of the sprayed fuel on the wall surface of the combustion chamber would rather be avoided). Thus, the heat-insulating gas layer surrounding the air-fuel mixture layer can be either thinned or even eliminated altogether. This allows the heat to be transferred from inside the combustion chamber onto the wall surface of the combustion chamber, thus promoting warming up the engine body.

The fuel injection control unit may perform discrete injections including a plurality of fuel injections, and may set an interval between two successive injections of the discrete injections to be shorter while the engine body is cold than while the engine body is warm.

Injecting the fuel separately a number of times (e.g., twice or three times) while the engine body is warm reduces the diffusion of the fuel compared to a situation where the fuel is injected at a time, thus allowing the heat-insulating gas layer to be formed. This also allows a local fuel-air equivalence ratio to be decreased. For example, in a fuel injection valve such as an outwardly-opening fuel injection valve configured such that an effective cross-sectional area of the fuel injection nozzle orifice increases as a lift amount increases, the fuel injection rate and spray angle can be changed by changing the lift amount and/or the injection period. Thus, changing the lift amount and/or injection period of the fuel injection valve for a plurality of fuel injections would allow the spray of the fuel injected by each fuel injection to be directed toward respectively different regions inside the combustion chamber. This reduces the local fuel-air equivalence ratio of the air-fuel mixture layer, thus causing a decrease in combustion temperature, which contributes, in combination with the formation of the heat-insulating gas layer, toward significantly reducing the cooling loss.

Compared to the fuel injection mode in the warm state, the fuel is also injected a number of times in the cold state, but the interval between two successive injections is shortened in the cold state. Note that the number of times of injections in the cold state may be the same as, or different from, the one in the warm state. For example, in the cold state, the number of times of injections may be smaller than in the warm state.

The spray flow, formed in the combustion chamber by the injection of the fuel through the fuel injection valve, comes to trap the surrounding air (or a gas including the air). A shorter interval between two successive injections would have the spray of the fuel injected later strongly affected by, and attracted toward, the air flow produced by the spray of the fuel injected earlier. As a result, the spray of the fuel injected later approaches the spray of the fuel injected earlier. This allows the sprays of the fuel, injected into the combustion chamber through multiple fuel injections in the cold state, to approach each other, thus making the local fuel-air equivalence ratio in the air-fuel mixture layer higher than in the warm state. Even if the fuel is injected to the same amount, the combustion temperature becomes relatively high in the cold state. This promotes warming up the engine body. Note that to raise the combustion temperature, the local fuel-air equivalence ratio is suitably brought as close to one as possible to the extent that the equivalence ratio does not exceed one.

The fuel injection control device for the direct injection engine may further include an air volume adjuster configured to adjust the volume of air introduced into the cylinder. The air volume adjuster may decrease the volume of the air introduced into the cylinder while the catalyst device is inactive and the engine body is cold with respect to the volume of the air introduced while the engine body is warm.

This makes the fuel-air equivalence ratio of the entire gas in the combustion chamber closer to one while the engine body is cold, thus making the combustion temperature higher than the temperature while the engine body is warm. Such an increase in the combustion temperature, in combination with thinning the heat-insulating gas layer, will promote warming up the engine body. In addition, reducing the volume of the air introduced into the cylinder makes the fuel-air equivalence ratio closer to one without increasing the amount of the fuel injected, thus cutting down the amount of the fuel consumed. On the other hand, while the engine body is warm, the gas in the combustion chamber becomes leaner than while the engine body is cold, thus causing a decline in combustion temperature. Such a decline in combustion temperature, in combination with the formation of the heat-insulating gas layer, effectively contributes to reducing the cooling loss, and eventually, increasing the thermal efficiency of the engine body.

While the catalyst device is inactive and has a temperature exceeding a predetermined temperature, the air volume adjuster may set the fuel-air equivalence ratio of the air-fuel mixture layer to be equal to or greater than one and set the fuel-air equivalence ratio of the entire gas in the combustion chamber to be either equal to one or closer to one than when the temperature of the catalyst device is equal to or lower than the predetermined temperature.

While the catalyst device is inactive but has a temperature that has increased to reach a predetermined temperature, the fuel-air equivalence ratio of the air-fuel mixture layer in the combustion chamber is set to be equal to or greater than one. This allows CO to be exhausted from the engine body and subjected to an oxidation reaction in the catalyst device. This heat generation reaction raises the temperature of the catalyst device. In this case, the predetermined temperature may be set appropriately to be a temperature that allows the catalyst device to purify CO. Also, the fuel-air equivalence ratio of the entire gas in the combustion chamber is either equal to, or close to, one, thus raising the combustion temperature as well. This allows the catalyst device to be activated early.

Optionally, even according to this configuration, the fuel-air equivalence ratio of the air-fuel mixture layer may be set to be equal to or greater than one, and the fuel-air equivalence ratio of the entire gas in the combustion chamber may be set to be equal to, or closer to, one by decreasing the volume of the air introduced into the cylinder. This allows the amount of the fuel consumed to be cut down.

The air volume adjuster may be configured to adjust the volume of the air introduced into the cylinder by adjusting the degree of opening of a throttle valve provided for the intake side of the engine body, for example.

Alternatively, the air volume adjuster may also decrease the volume of the air introduced into the cylinder by introducing a burned gas into the cylinder.

This allows the air volume to be reduced without decreasing the flow rate of the gas introduced into the cylinder, thus making the fuel-air equivalence ratio adjustable while the catalyst device is inactive as described above. In addition, even when the air volume is small, the flow rate of the gas introduced into the cylinder can still be increased, thus curbing a decline in effective compression ratio. This can make the pressure and temperature in the cylinder relatively high during the compression stroke, thus preventing the spray of the fuel, injected into the cylinder, from traveling longer than expected and making unwanted contact with the wall surface of the combustion chamber. That is to say, this allows the heat-insulating gas layer to be thickened while the catalyst device is inactive. Furthermore, there is no need to decrease the degree of opening of the throttle valve, thus cutting down the pump loss as well.

Advantages of the Invention

As can be seen from the foregoing description, the fuel injection control device for the direct injection engine forms an air-fuel mixture layer and a heat-insulating gas layer to reduce the cooling loss while the engine body is warm, and makes the heat-insulating gas layer thinner as the temperature of the engine body becomes lower, thus promoting warming up the engine body while the engine body is cold.

BRIEF DESCRIPTION OF THE DRAWINGS

FIG. 7 illustrates a state of the air-fuel mixture in the combustion chamber when the temperature of a catalyst exceeds a predetermined temperature while the catalyst is inactive and the engine is cold.

FIG. 8 illustrates a state of the air-fuel mixture in the combustion chamber while the catalyst is active and the engine is cold.

FIG. 9 illustrates a different fuel injection mode from the one shown in FIG. 4.

DESCRIPTION OF EMBODIMENTS

Embodiments will be described with reference to the accompanying drawings. The following description is only an example.

(Overall Configuration of Engine)

Figure 1:
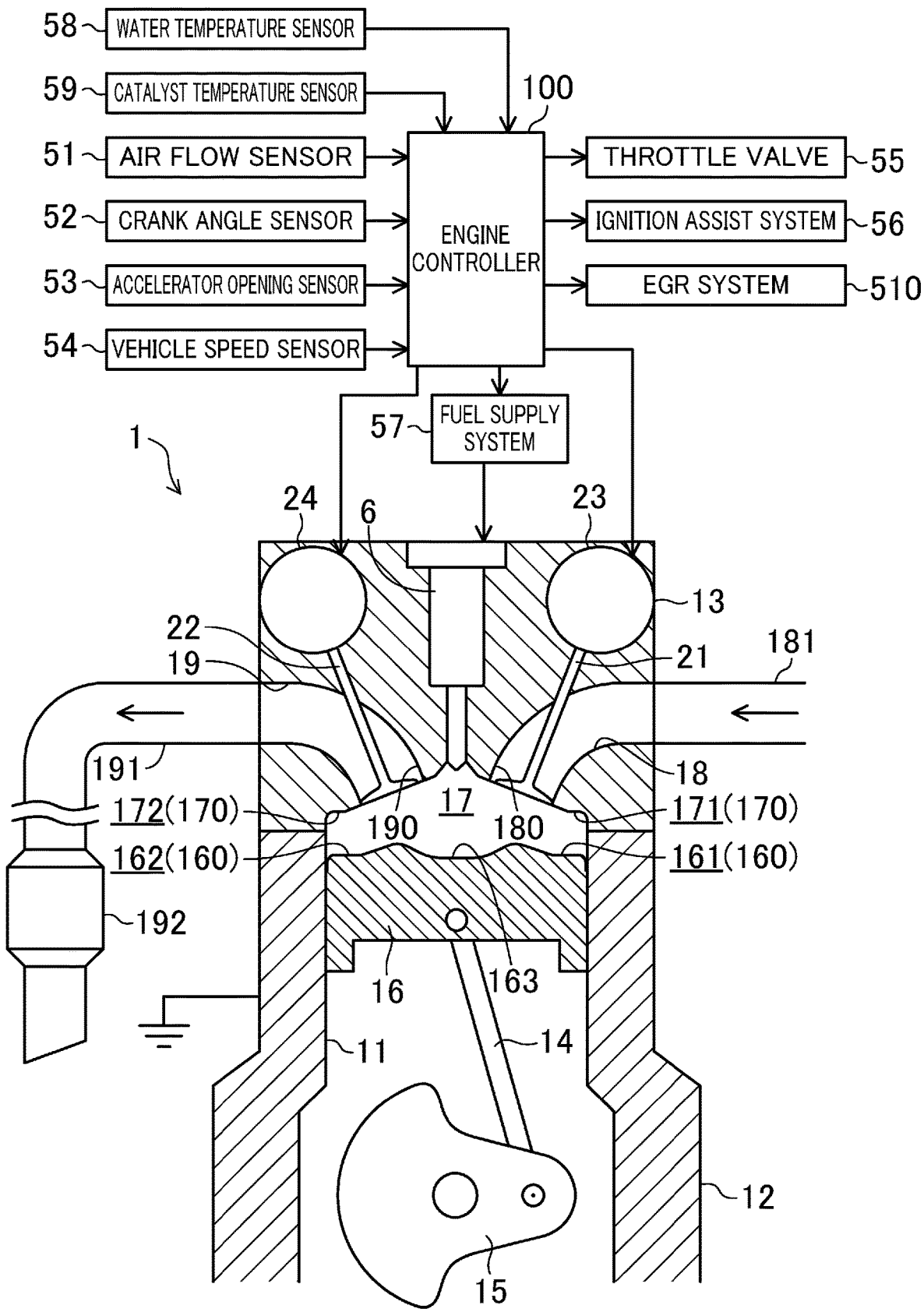
FIG. 1 schematically illustrates a configuration for a direct-injection engine.

FIG. 1 illustrates a configuration for an engine 1 according to an embodiment. Although not shown, the crankshaft 15 of the engine 1 is coupled to driving wheels via a transmission. The output of the engine 1 is transmitted to the driving wheels, thus propelling the vehicle forward. The fuel of the engine 1 is gasoline in this embodiment, but may be gasoline containing bioethanol or any other additive. The present disclosure is broadly applicable to any type of premixed combustion engine which ignites with vaporization of a fuel that has been injected and which uses any of various types of liquid fuels.

The engine 1 includes a cylinder block 12, and a cylinder head 13 mounted on the cylinder block 12. A plurality of cylinders 11 are formed inside the cylinder block 12 (although only one of those cylinders 11 is shown in FIG. 1). The engine 1 is a multi-cylinder engine. Although not shown, a water jacket, in which cooling water flows, is formed inside the cylinder block 12 and the cylinder head 13. A piston 16, which is coupled to the crankshaft 15 via a connecting rod 14, is slidably fitted into each of the cylinders 11. The piston 16 defines a combustion chamber 17 together with the cylinder 11 and the cylinder head 13.

Figure 2:
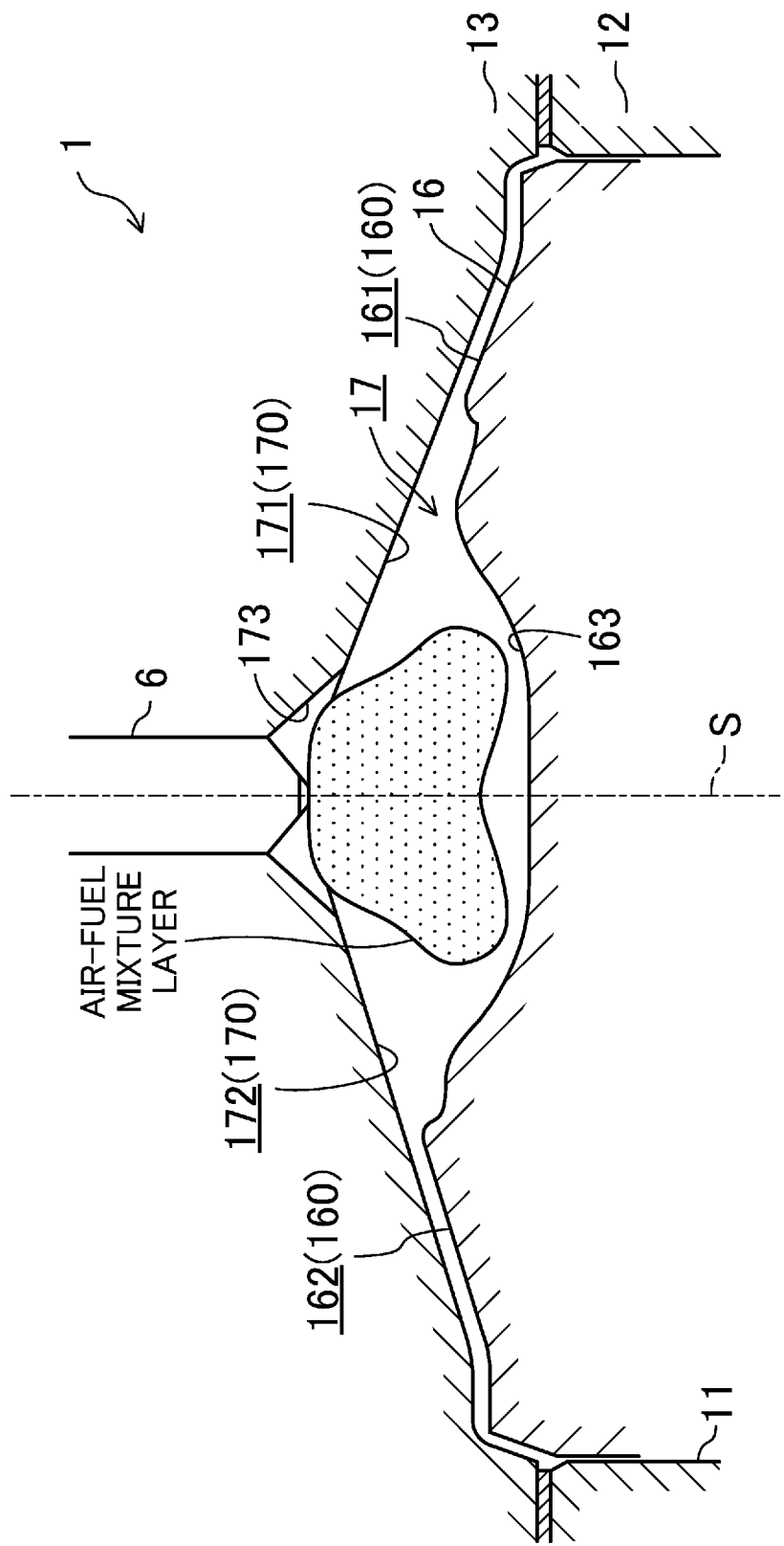
FIG. 2 is a cross-sectional view illustrating the configuration of a combustion chamber.

In this embodiment, the ceiling portion 170 of the combustion chamber 17 (i.e., the lower surface of the cylinder head 13) is configured to have an intake side slope 171 provided with an opening 180 of an intake port 18 and having an uphill gradient toward the center of the cylinder 11 and an exhaust side slope 172 provided with an opening 190 of an exhaust port 19 and having an uphill gradient toward the center of the cylinder 11. The combustion chamber 17 is of a so-called "pent roof type." The ridge of the pent roof may or may not agree with the bore center of the cylinder 11. As also shown in FIG. 2, the top surface 160 of the piston 16 is raised to form a triangular roof shape, which is defined by sloped surfaces 161, 162, each having an uphill gradient toward the center of the piston 16, on the intake and exhaust sides, respectively, so as to respectively face the intake side and exhaust side slopes 171 and 172 of the ceiling portion 170. Thus, the geometric compression ratio of the engine 1 is set to be as high as 15 or more. Also, the top surface 160 of the piston 16 has a recessed cavity 163.

Although only one intake port is shown in FIG. 1, two intake ports 18 are actually provided for the cylinder head 13 of each cylinder 11. The respective openings 180 of the two intake ports 18 are arranged side by side in the direction of the engine's output shaft (i.e., the crankshaft 15) on the intake side slope 171 of the cylinder head 13. The intake ports 18 communicate with the combustion chamber 17 through these openings 180. Likewise, two exhaust ports 19 are provided for the cylinder head 13 of each cylinder 11. The respective openings 190 of the two exhaust ports 19 are arranged side by side in the direction of the engine's output shaft on the exhaust side slope 172 of the cylinder head 13. The exhaust ports 19 communicate with the combustion chamber 17 through these openings 190.

Each of the intake ports 18 is connected to an associated intake passage 181. A throttle valve 55 for controlling the intake flow rate is provided halfway through the intake passage 181. Each of the exhaust ports 19 is connected to an associated exhaust passage 191. An exhaust gas purification system with one or more catalyst converters 192 is arranged on the exhaust passage 191. Each of the catalyst converters 192 may include a three way catalyst. However, the catalyst converter 192 does not have to be a three way catalyst.

The cylinder head 13 is provided with an intake valve 21 arranged so as to be capable of shutting off the intake ports 18 from the combustion chamber 17 (i.e., closing the combustion chamber 17). The intake valve 21 is driven by an intake valve drive mechanism. The cylinder head 13 is also provided with an exhaust valve 22 arranged so as to be capable of shutting off the exhaust ports 19 from the combustion chamber 17. The exhaust valve 22 is driven by an exhaust valve drive mechanism. The intake valve 21 and the exhaust valve 22 reciprocate at predetermined timing to open and close the intake ports 18 and the exhaust ports 19, respectively, thereby exchanging the gas in the cylinder 11.

Although not shown, the intake valve drive mechanism includes an intake camshaft, which is drive-coupled to the crankshaft 15. The intake camshaft rotates in synchronization with the rotation of the crankshaft 15. Although not shown, an exhaust valve drive mechanism includes an exhaust camshaft, which is drive-coupled to the crankshaft 15. The exhaust camshaft rotates in synchronization with the rotation of the crankshaft 15.

In this example, the intake valve drive mechanism includes at least a hydraulic or electric variable valve timing (VVT) mechanism 23 capable of continuously changing the phase of the intake camshaft within a predetermined angle range. The intake valve drive mechanism may further include a variable valve lift mechanism capable of changing the valve lift amount as well as the VVT mechanism 23.

In this example, the exhaust valve drive mechanism includes at least a hydraulic or electric VVT mechanism 24 capable of continuously changing the phase of the exhaust camshaft within a predetermined angle range. The exhaust valve drive mechanism may further include a variable valve lift mechanism capable of changing the valve lift amount as well as the VVT mechanism 24.

The variable valve lift mechanism may also be a continuous variable valve lift (CVVL) mechanism capable of continuously changing the valve lift amount. Note that the valve drive mechanisms for driving the intake valve 21 and the exhaust valve 22 may also be any other types of drive mechanisms, which may be hydraulic or electromagnetic drive mechanisms, for example.

As shown in FIG. 2 on a larger scale, a fuel injection valve 6 for directly injecting the fuel into the combustion chamber 17 is attached to the cylinder head 13. The fuel injection valve 6 is arranged on the pent roof ridge on which the intake side slope 171 and the exhaust side slope 172 intersect with each other. The fuel injection valve 6 is also arranged such that its injection axis S is aligned with the axis of the cylinder 11 and the tip end of its injection orifice faces the inside of the combustion chamber 17. Note that the injection axis S of the fuel injection valve 6 may or may not be aligned with the axis of the cylinder 11.

The cavity 163 of the piston 16 is arranged to face to the fuel injection valve 6. The fuel injection valve 6 injects the fuel into the cavity 163.

The fuel injection valve 6 is implemented as an outwardly-opening fuel injection valve in this example. The outwardly-opening fuel injection valve 6 has a nozzle body 60 with a nozzle orifice 61 through which the fuel is injected, and an outwardly-opening valve 62 which opens and closes the nozzle orifice 61, as shown in FIG. 3 illustrating its tip end on a larger scale.

The nozzle body 60 is formed as a tubular member such that the fuel flows through the inside of the nozzle body 60. The nozzle orifice 61 is provided at the tip end of the nozzle body 60. The nozzle orifice 61 is tapered such that its diameter gradually increases toward the tip.

The outwardly-opening valve 62 has a valve body 63, exposed to the outside of the nozzle body 60 at the tip of the nozzle body 60, and a connecting portion 64 extending from the valve body 63, passing through the nozzle body 60, and connected to a piezoelectric element (not shown). The valve body 63 includes a seating portion 65 having substantially the same shape as the tapered nozzle orifice 61. There is a decreased diameter portion 66 between the seating portion 65 and connecting portion 64 of the valve body 63. As shown in FIG. 3, the decreased diameter portion 66 has a different inclination from the seating portion 65. Specifically, the decreased diameter portion 66 inclines from the base end toward the tip end more gently than the seating portion 65.

Figure 3:
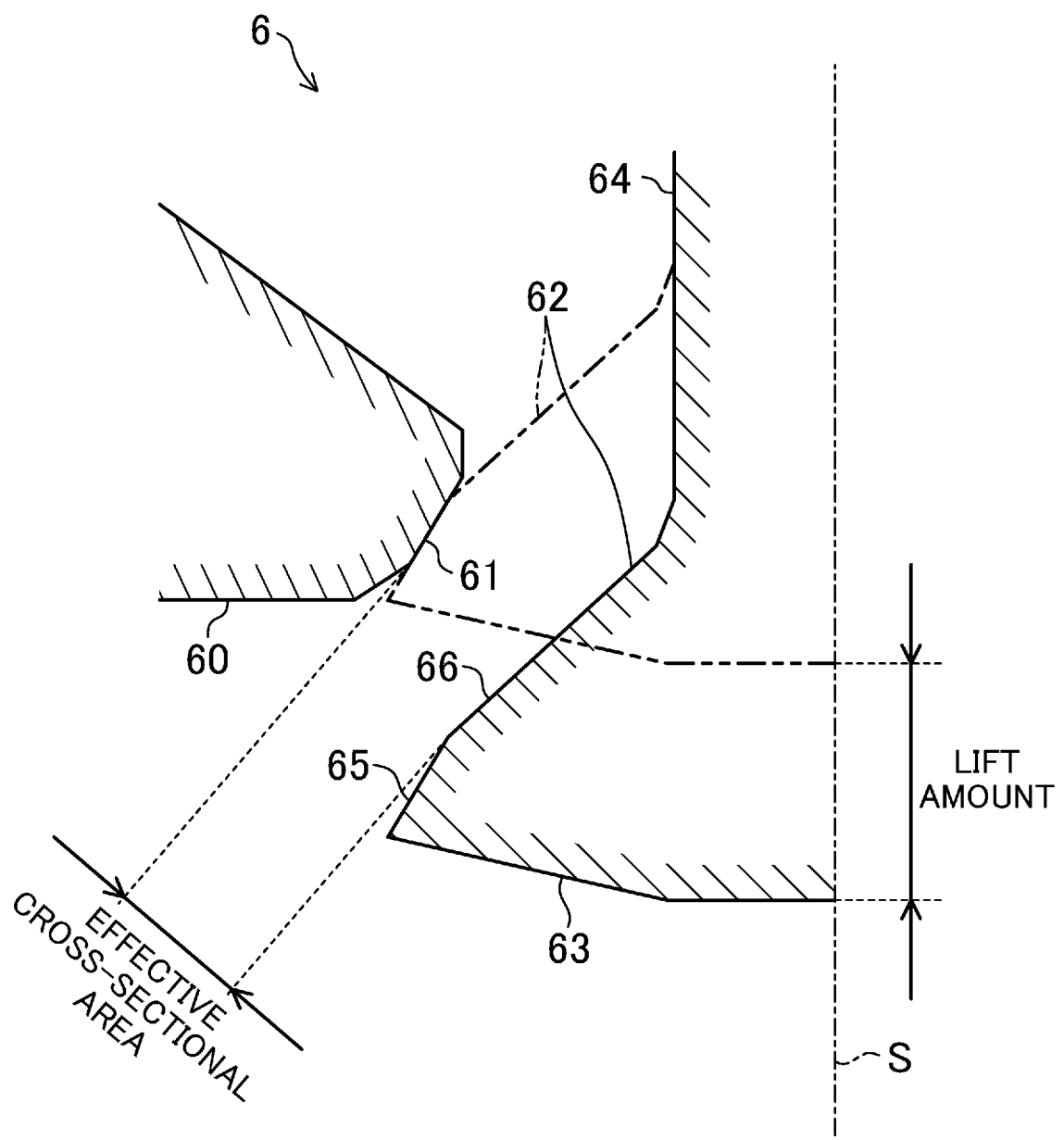
FIG. 3 illustrates how the effective cross-sectional area of the nozzle orifice of an outwardly-opening fuel injection valve changes with the lift amount.

As indicated by the two-dot chain in FIG. 3, while the seating portion 65 abuts on the nozzle orifice 61, the nozzle orifice 61 is closed. The piezoelectric element is deformed upon the application of a voltage thereto, thus outwardly lifting the outwardly-opening valve 42 along the injection axis S. Consequently, as indicated by the solid lines in FIG.

3, the seating portion 65 moves away from the nozzle orifice 61, thus making the nozzle orifice 61 open. When the nozzle orifice 61 is opened, the fuel is injected through the nozzle orifice 61 in a direction inclined with respect to the injection axis S and spreading radially with respect to the injection axis S as the center axis. Specifically, the fuel is injected in the shape of a hollow cone, of which the center axis is defined by the injection axis S. When the application of the voltage to the piezoelectric element stops, the piezoelectric element recovers its original shape, thus having the seating portion 65 of the outwardly-opening valve 62 abut on the nozzle orifice 61 and close the nozzle orifice 61 again.

As the voltage applied to the piezoelectric element increases, the lift amount of the outwardly-opening valve 62 from the state closing the nozzle orifice 61 increases. As is clear from FIG. 3, the larger the lift amount is, the greater the degree of opening (i.e., the effective cross-sectional area) of the nozzle orifice 61 becomes. In this case, the effective cross-sectional area is defined by the distance from the nozzle orifice 61 to the seating portion 65. As the lift amount increases, so does the size of the particles of the spray of the fuel injected through the nozzle orifice 61 into the combustion chamber 17. Conversely, as the lift amount decreases, so does the size of the particles of the spray of the fuel injected through the nozzle orifice 61 into the combustion chamber 17. Also, while passing through the nozzle orifice 61, the fuel flows along the decreased diameter portion 66. As the lift amount increases, the decreased diameter portion 66 becomes more distant from the nozzle orifice 61, and therefore, the spray angle of the fuel (i.e., the taper angle of the hollow cone) becomes narrower. Meanwhile, as the lift amount decreases, the decreased diameter portion 66 becomes closer to the nozzle orifice 61, and therefore, the spray angle of the fuel (i.e., the taper angle of the hollow cone) becomes wider.

Also, supposing the fuel pressure is constant, the larger the effective cross-sectional area is, the lower the injection rate becomes. Conversely, as the effective cross-sectional area decreases, the injection rate increases. However, if the effective cross-sectional area becomes too small, then the effect of the frictional resistance caused by the wall surface of the injection orifice on the fuel becomes so significant that the injection rate becomes low. Thus, there is a lift amount at which the fuel injection rate becomes maximum. The fuel injection rate decreases, no matter whether the lift amount is larger or smaller than the maximum rate lift amount. Note that this maximum rate lift amount is relatively small.

As shown in FIG. 2, the ceiling portion 170 of the cylinder head 13 has a recess 173, which is recessed from the ceiling surface, and the tip end of the fuel injection valve 6 is housed in the recess 173. The inner surface of the recess 173 is sloped such that its diameter gradually increases toward the inside of the combustion chamber 17. Arranging the tip end of the fuel injection valve 6 at a position deeper than the ceiling surface of the cylinder head 13 can make the gap between the top surface 160 of the piston 16 and the tip end of the fuel injection valve 6 as wide as possible when the piston 16 reaches the top dead center, while increasing the geometric compression ratio. This is advantageous in forming the heat-insulating gas layer around the air-fuel mixture layer as will be described later. In addition, the gap between the tip end of the fuel injection valve 6 and the inner surface of the recess 173 widens so much as to substantially prevent the spray of the fuel injected from the fuel injection valve 6 from being deposited on the ceiling surface of the cylinder head 13 due to the Coanda effect.

A fuel supply system 57 includes an electrical circuit for driving the outwardly-opening valve 62, and a fuel supply system supplying the fuel to the fuel injection valve 6. The engine controller 100 outputs an injection signal, having a voltage corresponding to the lift amount, to the electrical circuit at predetermined timing, thereby operating, via the electrical circuit, the outwardly-opening valve 62 so that a desired amount of the fuel is injected into the cylinder. When the injection signal is not output (i.e., when the injection signal has a voltage of zero), the nozzle orifice 61 is closed by the outwardly-opening valve 62. In this manner, the operation of the piezoelectric element is controlled by the injection signal from the engine controller 100. The engine controller 100 controls the operation of the piezoelectric element, thereby controlling the fuel injection through the nozzle orifice 61 of the fuel injection valve 6 and the lift amount at the time of the fuel injection. Since the piezoelectric element is highly responsive, multi-stage injections can be performed, e.g., about twenty injections can be performed in 1-2 msec. However, the means for operating the outwardly-opening valve 62 is not limited to the piezoelectric element.

Although not shown, the fuel supply system is provided with a high-pressure fuel pump and a common rail. The high-pressure fuel pump pressure-feeds the fuel, supplied from a fuel tank through a low-pressure fuel pump, to the common rail, which stores the pressure-fed fuel at a predetermined fuel pressure. Then, the fuel injection valve 6 is operated (i.e., the outwardly-opening valve 62 is lifted) to inject the fuel stored in the common rail through the nozzle orifice 61. A fuel injection control unit is comprised of the engine controller 100 and the fuel injection valve 6.

As will be described in detail later, the fuel injection control unit is configured such that a (combustible) air-fuel mixture layer and a heat-insulating gas layer, surrounding the air-fuel mixture layer, can be formed in the combustion chamber 17 (i.e., inside the cavity 163) as schematically shown in FIG. 2.

This engine 1 is configured to burn, basically in the entire operation range, the air-fuel mixture formed in the cylinder 11 by compression ignition (i.e., by controlled auto ignition (CAI)). The engine 1 includes an ignition assist system 56 for assisting the air-fuel mixture with ignition under a predetermined environment. The ignition assist system 56 may be a discharge plug arranged to face the combustion chamber 17, for example. That is to say, applying controlled pulses of a high voltage to the electrode of the discharge plug to generate an extremely short pulse discharge in the combustion chamber 17 allows a streamer discharge to be generated in the combustion chamber, thus producing ozone in the cylinder. The ozone assists the CAI. Note that the ignition assist system does not have to be implemented as a discharge plug for producing ozone but may also be a spur plug for assisting the CAI by applying energy to the air-fuel mixture through a spark discharge.

The engine 1 further includes an EGR system 510 configured to re-introduce the burned gas into the cylinder 11. The EGR system 510 includes both an external EGR system for reintroducing the burned gas into the cylinder 11 through an EGR passage that connects together the exhaust and intake passages 191 and 181 of the engine 1 and an internal EGR system for allowing part of the burned gas in the cylinder 11 to substantially stay in the cylinder 11.

The engine controller 100 is a controller including a known microcomputer as a base element. The engine controller 100 includes a central processing unit (CPU) that executes programs, a memory configured, for example, as a RAM and a ROM and storing programs and data, and an input and output (I/O) bus inputting and outputting electrical signals.

The engine controller 100 receives at least a signal indicating the flow rate of intake air from an air flow sensor 51, a crank angle pulse signal from a crank angle sensor 52, an accelerator opening signal from an accelerator opening sensor 53 which detects the degree of depression of the accelerator pedal, a vehicle speed signal from a vehicle speed sensor 54, the engine's 1 cooling water temperature signal from a water temperature sensor 58, and the catalyst converter's 192 temperature signal from the catalyst temperature sensor 59. Based on these input signals, the engine controller 100 calculates parameters for controlling the engine 1, such as desired throttle opening signal, fuel injection pulse, ignition assist signal, and valve phase angle signal. Then, the engine controller 100 outputs these signals to the throttle valve 55 (more accurately, a throttle actuator which operates the throttle valve 55), the VVT mechanisms 23, 24, the fuel supply system 57, the ignition assist system 56, the EGR system 510, and so on.

The geometric compression ratio c of the engine 1 is set to be equal to or greater than 15, as described above. The geometric compression ratio may be equal to or less than 40, and is suitably in the range of 20 to 35. The engine 1 is configured to have an expansion ratio that increases as the compression ratio rises. Thus, the engine 1 has a high compression ratio and a relatively high expansion ratio at the same time. A high geometric compression ratio stabilizes the CAI combustion.

The combustion chamber 17 is defined by the inner wall surface of the cylinder 11, the top surface 160 of the piston 16, the lower surface (i.e., the ceiling surface 170) of the cylinder head 13, and the respective valve head surfaces of the intake valve 21 and exhaust valve 22. Heat shield layers are respectively provided at the above-mentioned surfaces to reduce the cooling loss. This insulates the combustion chamber 17 from heat. The heat shield layers may be provided on all or part of the defining surfaces. Moreover, the heat shield layer may also be provided on the wall surfaces of the intake ports 18 and the exhaust ports 19 near the openings at the ceiling portion 170 of the combustion chamber 17, although such wall surfaces are not the wall surfaces directly defining the combustion chamber 17.

These heat shield layers are designed to have lower thermal conductivity than the base metal member forming the combustion chamber 17 to substantially prevent the heat of the combustion gas in the combustion chamber 17 from being dissipated through the defining surfaces.

The heat shield layers suitably have lower volumetric specific heat than the base members to reduce the cooling loss. That is to say, it is therefore beneficial to reduce the thermal capacity of the heat shield layers so that the temperature at the surfaces defining the combustion chamber 17 changes in accordance with the change in the gas temperature in the combustion chamber 17.

The heat shield layers may be formed by coating a base member with a ceramic material, such as $ZrO_2$, by plasma spray coating, for example. The ceramic material may have a large number of pores. This allows for further reducing the thermal conductivity and volumetric specific heat of the heat shield layers.

According to this embodiment, not only adopting the heat shield structure for the combustion chamber but also forming a heat-insulating gas layer in the combustion chamber 17 while the engine 1 is warm (i.e., has a temperature equal to or greater than a predetermined temperature) allow the cooling loss to be reduced significantly.

Specifically, injecting the fuel through the tip end of the injection nozzle of the fuel injection valve 6 into the cavity 163 on or after the compression stroke such that a gas layer including fresh air is formed in a peripheral region inside the combustion chamber 17 and that an air-fuel mixture layer is formed in the central region thereof allows for implementing a layered structure in which the air-fuel mixture layer is formed in the central region inside the cavity 163 in the vicinity of the fuel injection valve 6 and a heat-insulating gas layer, including fresh air, is formed to surround the air-fuel mixture layer as shown in FIG. 2. As used herein, the air-fuel mixture layer may be defined as a layer comprised of a combustible air-fuel mixture, which may be an air-fuel mixture with a fuel-air equivalence ratio $\varphi$ of 0.1 or more, for example. The longer the time that has passed since the start of injection of a fuel is, the more the spray of the fuel spreads. Thus, the size of the air-fuel mixture layer is the size measured at the time of ignition. A fuel may be regarded as having ignited when the combustion mass ratio of the fuel becomes equal to or greater than 1%, for example. The air-fuel mixture ignites in the vicinity of the compression top dead center.

The heat-insulating gas layer may consist essentially of fresh air or may additionally include a burned gas (i.e., an EGR gas) as well as fresh air. There is no problem even if the heat-insulating gas layer includes a small amount of the fuel. Rather, the heat-insulating gas layer needs to be more fuel-lean than the air-fuel mixture layer so as to function as a heat insulating layer.

The fuel-air equivalence ratio $\varphi$ of the entire gas, including the air-fuel mixture layer and the heat-insulating gas layer, in the combustion chamber 17 is set to be less than one (i.e., such that A/F (or G/F) becomes leaner than the stoichiometric air-fuel ratio).

Figure 4:
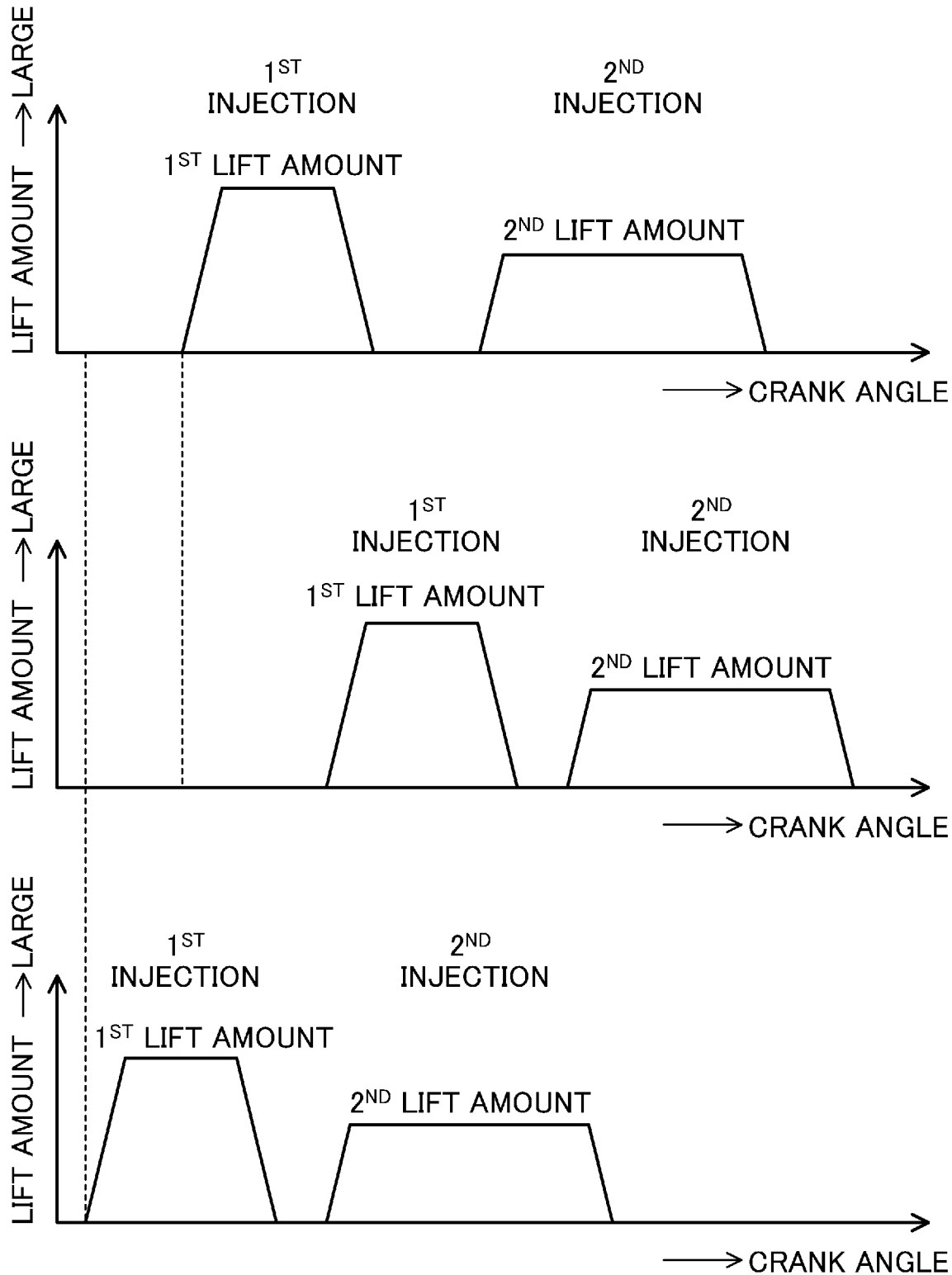
FIG. 4 The top graph of FIG. 4 shows a fuel injection mode while the engine is warm, the middle graph of FIG. 4 shows a fuel injection mode while the catalyst is inactive and the engine is cold, and the bottom graph of FIG. 4 shows a fuel injection mode while the catalyst is active and the engine is cold.
Figure 5:
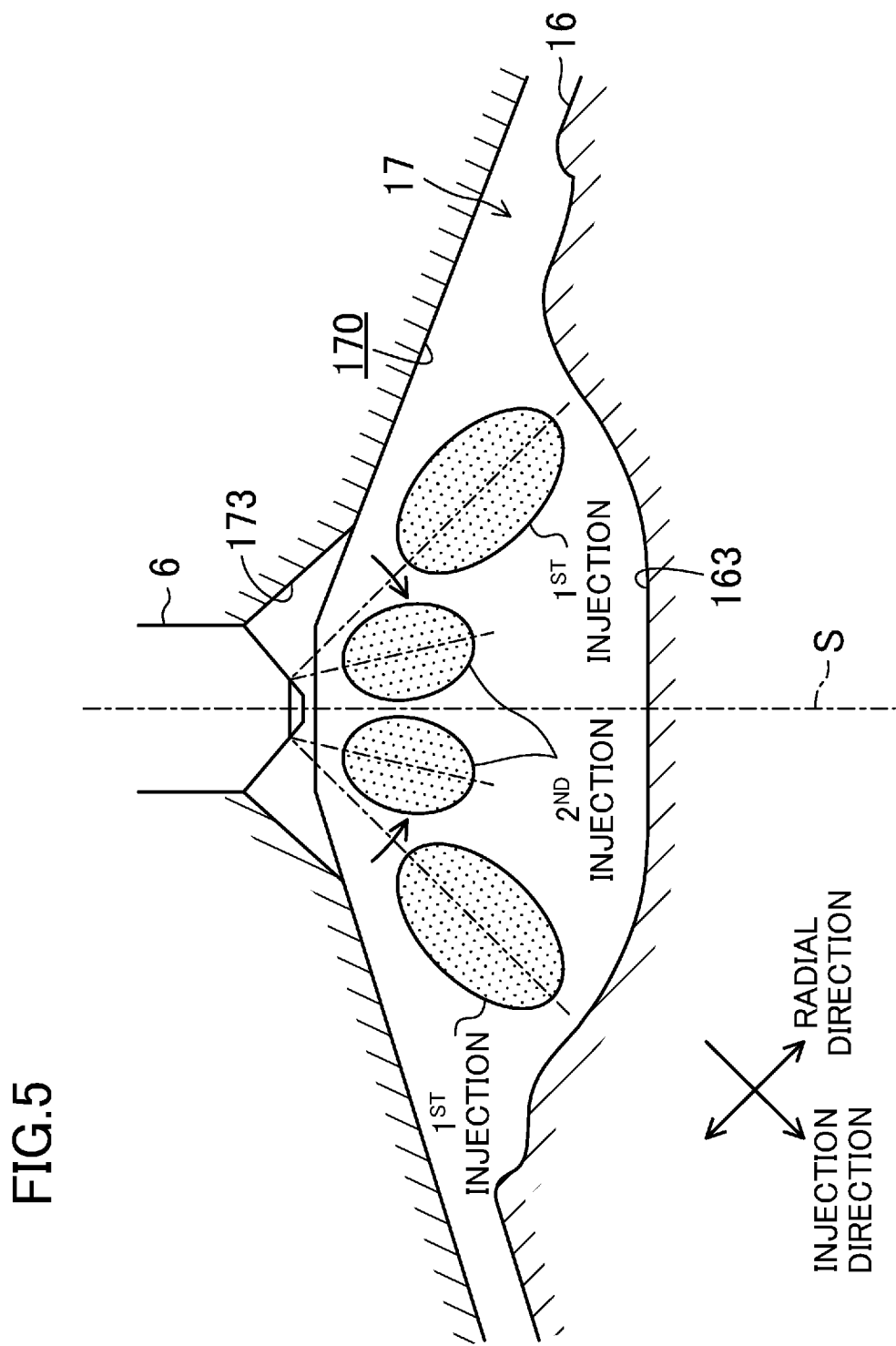
FIG. 5 illustrates how sprays of a fuel spread in the combustion chamber.

The top graph of FIG. 4 shows the fuel injection mode of the engine 1 while the engine 1 is warm. The fuel injection is implemented as discrete injections including a first injection as a preceding injection and a second injection as a succeeding injection. The first injection is injection of the fuel in a first lift amount at a relatively advanced timing. The first lift amount is greater than the maximum rate lift amount described above at which the fuel injection rate becomes maximum. Increasing the lift amount when the fuel starts to be injected reduces the resistance caused by the wall surface of the nozzle orifice 61, thus allowing the fuel injection rate to rise quickly. Thus, the fuel injection rate by the first injection becomes relatively high, although the injection period is short. The first injection is performed during the compression stroke. Part or all of the first injection may be performed during the second half of the compression stroke. Its injection period is shorter than that of the second injection to be described below. As a result, as schematically shown in FIG. 5, the spray of the fuel injected by the first injection comes to have a predetermined spray angle and spread to the vicinity of the wall surface of the combustion chamber 17. Nevertheless, the spray of the fuel injected initially into the combustion chamber 17 by the first injection is subjected to relatively high resistance that makes the particles difficult to travel over a long distance, thus substantially preventing the fuel particles from contacting with the wall surface of the combustion chamber 17.

The second injection is performed at a predetermined interval after the first injection has been performed. The interval between the first and second injections is set to be relatively long. Part or all of the second injection may be performed during the second half of the compression stroke. The second injection is injection of the fuel in a second lift amount, which is smaller than the first lift amount. The second lift amount, as well as the first lift amount, is suitably greater than the maximum rate lift amount. Decreasing the lift amount when the fuel starts to be injected raises the resistance caused by the wall surface of the nozzle orifice 61, thus delaying a rise in the fuel injection rate. The fuel injection rate by the second injection is initially low for a while after the start of the injection. Decreasing the injection rate of the spray of fuel injected by the second injection in this manner prevents the spray of the fuel injected by the second injection from catching up, and overlapping, with the spray of the fuel injected by the first injection.

The second injection also has its injection period set to be longer than the injection period of the first injection. Thus, the spray of the fuel injected by the second injection comes closer to the injection axis S of the fuel injection valve 6. In other words, the spray flow, formed in the combustion chamber 17 by the injection of the fuel, comes to trap the surrounding air. However, it is difficult for the air to enter the spray of the fuel injected in a hollow cone shape through the tip end of the fuel injection valve 6. Thus, as the injection period is prolonged, the negative pressure rises around the injection axis S of the fuel injection valve 6. Thus, the pressure difference between inside and outside the spray of the fuel makes the spray of the fuel come even closer to the injection axis S of the fuel injection valve 6 as indicated by the solid arrows in FIG. 5. Thus, the spray of the fuel injected by the first injection and the spray of the fuel injected by the second injection are going to shift from each other in the angular direction of the spray. More specifically, in a radial direction intersecting at right angles with the centerline of the spray of the fuel injected by the first injection, the spray of the fuel injected by the second injection comes to be located radially inside of the spray of the fuel injected by the first injection. This substantially prevents the two sprays of the fuel from overlapping with each other.

Thus, while the engine 1 is warm, the sprays of the fuel injected by the first and second injections are located in mutually different regions inside the combustion chamber 17 while forming an air-fuel mixture layer and a heat-insulating gas layer inside the combustion chamber 17. This decreases a local fuel-air equivalence ratio of the air-fuel mixture layer.

As shown in FIG. 2, if the air-fuel mixture is allowed to burn by CAI with a heat-insulating gas layer and an air-fuel mixture layer formed, the heat-insulating gas layer between the air-fuel mixture layer and the wall surface of the combustion chamber 17 not only substantially prevents the flame of the air-fuel mixture layer from contacting with the wall surface of the combustion chamber 17 but also functions as a heat-insulating layer to reduce the transfer of the heat from inside the combustion chamber 17 onto the wall surface of the combustion chamber 17. In addition, lowering the local fuel-air equivalence ratio and combustion temperature of the air-fuel mixture layer allows the cooling loss to be reduced significantly while the engine 1 is warm.

Note that just reducing the cooling loss may allow the decrease in the cooling loss to be converted into exhaust loss, which does not greatly contribute to improving the indicated thermal efficiency. However, this engine 1 efficiently converts the energy of the combustion gas, corresponding to the decrease in the cooling loss, into mechanical work by increasing the expansion ratio involved with the increase in compression ratio. That is to say, it can be said that the engine 1 significantly improves the indicated thermal efficiency by adopting a configuration for reducing both the cooling loss and the exhaust loss.

To form such an air-fuel mixture layer and such a heat-insulating gas layer in the combustion chamber 17, the gas flow inside the combustion chamber 17 is suitably weak at the timing of injecting the fuel. For that purpose, the intake ports are configured to have a straight shape that either prevents or substantially reduces the production of a swirl inside the combustion chamber 17 and to make the tumble flow as weak as possible.

(Details of Fuel Injection Control)

While the engine 1 is warm, the thermal efficiency may be improved by reducing the cooling loss. Meanwhile, while the engine 1 is cold (i.e., while the temperature of the engine 1 is less than a predetermined temperature), the engine 1 should be warmed up. However, reducing the cooling loss by forming the heat-insulating gas layer as described above decreases the quantity of heat to be transferred from inside the combustion chamber 17 onto the wall surface of the combustion chamber 17, which is not advantageous in warming up the engine 1.

Also, even while the engine 1 is cold, if the catalyst converter 192 is inactive, a higher priority should be given to activating the catalyst converter 192 rather than warming up the engine 1.

Thus, this engine 1 changes the injection mode of the fuel into the combustion chamber 17 according to the degree of activation of the catalyst converter 192 and the temperature level of the engine 1.

The middle graph of FIG. 4 shows the fuel injection mode while the catalyst converter 192 is inactive and the engine 1 is cold. The bottom graph of FIG. 4 shows the fuel injection mode while the catalyst converter 192 is active and the engine 1 is cold. The top graph of FIG. 4 shows the fuel injection mode while the engine 1 is warm as described above. Note that the fuel injection amount is the same in the top, middle, and bottom graphs of FIG. 4. The engine controller 100 determines the temperature level of the engine 1 in accordance with a detection signal supplied from the water temperature sensor 58 and determines the degree of activation of the catalyst converter 192 in accordance with a detection signal supplied from the catalyst temperature sensor 59. Alternatively, the temperature level of the engine 1 may also be determined by any parameter other than the temperature of the cooling water, and the degree of activation of the catalyst converter 192 may also be determined by any parameter other than the catalyst temperature.

While the catalyst converter 192 is inactive, a higher priority should be given to activating the catalyst converter 192 rather than warming up the engine 1. Thus, the engine controller 100 sets the fuel injection mode as shown in the middle graph of FIG. 4. That is to say, while the catalyst converter 192 is inactive, discrete injections, including a first injection at a first lift amount and a second injection at a second lift amount, are performed as when the engine 1 is warm. While the catalyst converter 192 is inactive, the injection start timing of the first injection is retarded with respect to the timing while the engine 1 is warm. This makes the pressure and temperature in the cylinder 11 relatively high at the injection start timing of the first injection, thus substantially preventing the spray of the fuel injected from traveling longer than expected and reaching the wall surface of the combustion chamber 17. In addition, liquid droplets of the fuel injected can be substantially prevented from being deposited on the wall surface of the combustion chamber 17. While the catalyst converter 192 is inactive, an air-fuel mixture layer and a relatively thick heat-insulating gas layer, surrounding the air-fuel mixture layer, are also formed inside the combustion chamber 17 as when the engine 1 is warm. Forming a relatively thick heat-insulating gas layer reduces the transfer of heat from inside the combustion chamber 17 onto the wall surface of the combustion chamber 17 as described above, thus raising the temperature of the exhaust gas exhausted from the engine 1.

While the catalyst converter 192 is inactive, the engine controller 100 reduces the volume of the air introduced into the cylinder 11 with respect to the volume while the engine 1 is warm, thus making the fuel-air equivalence ratio φ of the entire gas in the combustion chamber 17, including the air-fuel mixture layer and the heat-insulating gas layer, less than one and closer to one than the ratio φ while the engine 1 is warm. The volume of the air introduced into the cylinder 11 may be reduced by decreasing the degree of opening of the throttle valve 55, for example. Alternatively, the volume of the air introduced into the cylinder 11 may also be reduced by having the EGR system 510 introduce a burned gas into the cylinder 11. Thus, reducing the volume of the air introduced into the cylinder 11 without increasing the amount of the fuel injected brings the fuel-air equivalence ratio φ of the entire gas in the combustion chamber 17 closer to one, thus cutting down the amount of the fuel consumed.

Bringing the fuel-air equivalence ratio φ closer to one raises the combustion temperature. Raising the combustion temperature in turn leads to increasing the temperature of the exhaust gas. In this case, the local air-fuel ratio A/F of the air-fuel mixture layer is suitably set to be around 16, at which the amount of HC exhausted becomes the smallest. This substantially prevents HC from being exhausted from the engine 1 while the catalyst converter 192 is inactive.

While the catalyst converter 192 is inactive, the interval between the first and second injections is set to be shorter than the interval while the engine 1 is warm. In FIG. 4, the abscissa indicates the crank angle. In the top, middle, and bottom graphs of FIG. 4, the engine speed is supposed to be the same. Thus, in the top, middle, and bottom graphs of FIG. 4, the width on the axis of abscissas represents not only the magnitude of the crank angle but also the length of the time as well.

A shorter time interval between two successive injections would have the spray of the fuel injected later strongly affected by, and attracted toward, the air flow produced by the spray of the fuel injected earlier. In particular, the second injection of the fuel injected later has a relatively small lift amount, and therefore, has a low initial injection rate at the fuel injection start timing. Thus, the second injection of the fuel injected later is strongly affected by, and comes closer toward, the air flow produced by the first injection of the fuel injected earlier. In this manner, while the catalyst converter 192 is inactive, the sprays of the fuel injected by the first and second injections approach each other inside the combustion chamber 17. This increases the local fuel-air equivalence ratio of the air-fuel mixture layer while the catalyst converter 192 is inactive, thus raising the combustion temperature.

Figure 6:
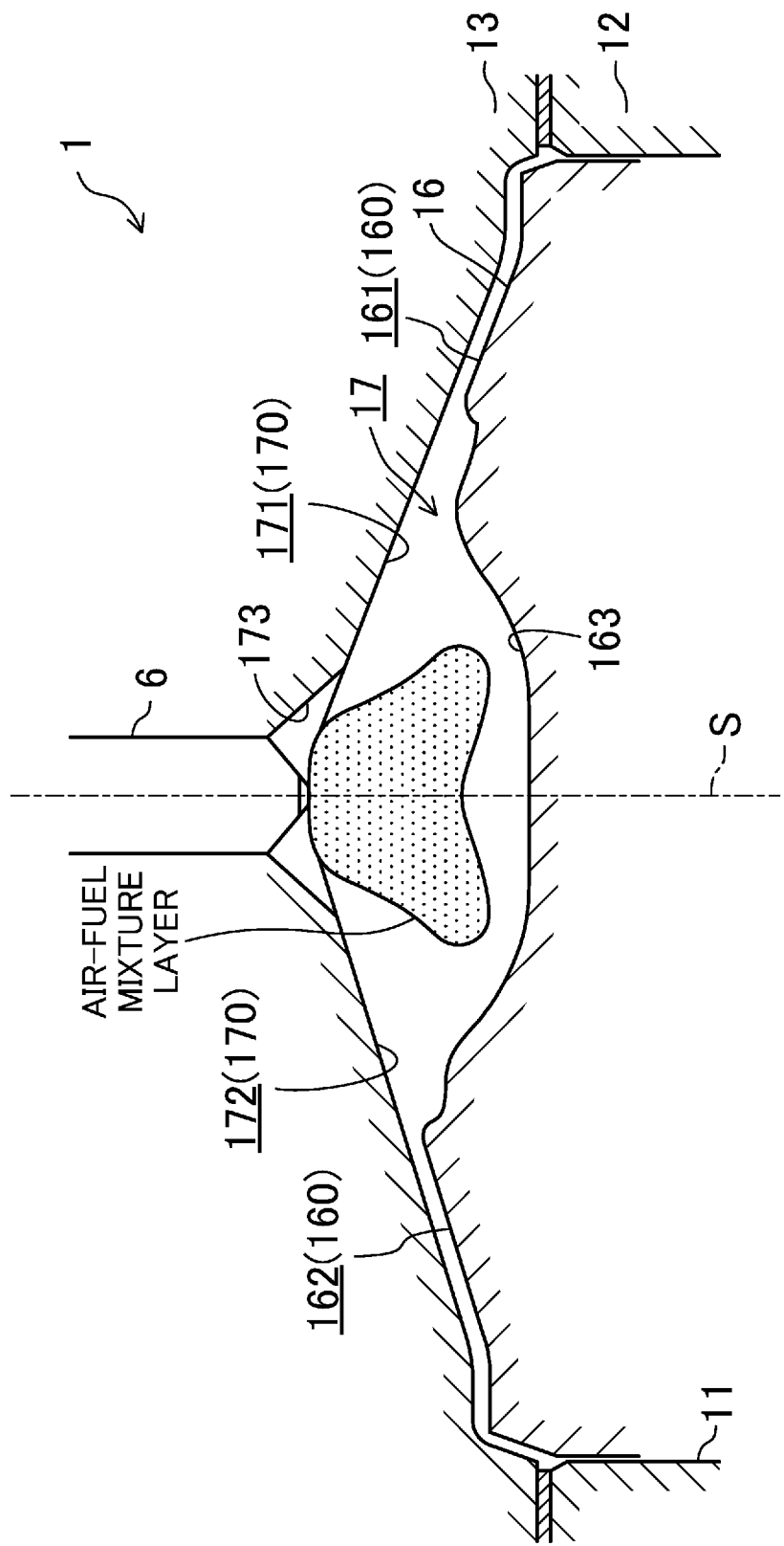
FIG. 6 illustrates a state of an air-fuel mixture in the combustion chamber while the catalyst is inactive and the engine is cold.

Thus, while the catalyst converter 192 is inactive, a heat-insulating gas layer, thicker than the heat-insulating gas layer shown in FIG. 2 while the engine is warm, is formed in the combustion chamber 17 as shown in FIG. 6, for example. This not only reduces the transfer of heat from inside the combustion chamber 17 onto the wall surface of the combustion chamber 17. In addition, this also brings the fuel-air equivalence ratio φ of the entire gas in the combustion chamber 17 closer to one than the ratio while the engine 1 is warm to raise the combustion temperature, while reducing the amount of HC exhausted with the air-fuel ratio A/F of the air-fuel mixture layer set to be around 16. Note that in FIGS. 2 and 6, the difference in the fuel-air equivalence ratio of the air-fuel mixture layer is indicated by the shade. This raises the temperature of the exhaust gas exhausted from the engine 1 and promotes the temperature rise of the catalyst converter 192. In addition, as shown in the middle graph of FIG. 4, retarding the injection start timing of the first injection also causes a delay in the injection end timing of the second injection. This can delay the combustion end timing with respect to the timing while the engine 1 is warm, thus further raising the temperature of the exhaust gas.

If the temperature of the catalyst converter 192 rises to reach a temperature (of about 100° C.) at which CO can be purified even though the catalyst converter 192 is still inactive, then the engine controller 100 turns the air-fuel mixture in the combustion chamber 17 into an even richer one. Specifically, the engine controller 100 sets the local fuel-air equivalence ratio φ of the heat-insulating layer to be equal to or greater than one by further reducing the volume of the air introduced into the cylinder 11. The fuel-air equivalence ratio φ of the entire gas in the combustion chamber 17 may be set to be either equal to, or less than, one. The fuel injection mode is as shown in the middle graph of FIG. 4. As shown in FIG. 7, an air-fuel mixture layer and a relatively thick heat-insulating gas layer are formed in the combustion chamber 17. The heat-insulating gas layer is approximately as thick as the counterpart of the example shown in FIG. 6. In FIG. 7, however, the air-fuel mixture layer is more fuel-rich than the layer formed while the catalyst is inactive as shown in FIG. 6. The difference in fuel-air equivalence ratio between the air-fuel mixture layers shown in FIGS. 7 and 6 is indicated by the shade. This allows a high-temperature exhaust gas to be exhausted from the engine 1.

Making the air-fuel mixture layer fuel-rich allows CO to be exhausted from the engine 1. That CO causes an oxidation reaction in the catalyst converter 192 to turn into $CO_2$. This heat generation reaction raises the temperature of the catalyst converter 192. This allows the catalyst converter 192 to be activated early. Note that HC is also exhausted from the engine 1 in the meantime. However, the quick activation of the catalyst converter 192 can still reduce the total amount of HC exhausted.

After the catalyst converter 192 has been activated, the engine controller 100 changes the fuel injection mode. Note that the engine 1 is still cold. Even while the engine 1 is cold, discrete injections, including first and second injections, are performed as shown in the bottom graph of FIG. 4. In this case, the injection start timing of the first injection is advanced with respect to the timing while the catalyst converter 192 is inactive. The injection start timing of the first injection is also advanced with respect to the timing while the engine 1 is warm. As a result, while the engine 1 is cold after the catalyst converter 192 has been activated, the fuel is injected when the pressure and temperature in the cylinder 11 are not high. Also, the first injection has a relatively large lift amount, and therefore, comes to have a relatively high injection rate as described above. This allows the spray of the fuel injected to reach the vicinity of the wall surface of the combustion chamber 17. As a result, the heat-insulating gas layer can be either eliminated or thinned as shown in FIG. 8. However, since the engine 1 currently has a low temperature, liquid droplets of the fuel injected should not be allowed to be deposited on the wall surface of the combustion chamber 17.

In addition, the injection start timing of the first injection is advanced adaptively to the temperature level of the engine 1 such that the lower the temperature of the engine 1 is, the thinner the heat-insulating gas layer becomes. Thus, retarding the injection start timing of the first injection as the temperature of the engine 1 rises allows the heat-insulating gas layer to grow thicker gradually.

The engine controller 100 further controls the throttle valve 55 and/or the EGR system 510 such that the fuel-air equivalence ratio $\varphi$ of the entire gas in the combustion chamber 17 becomes equal to or less than one, thereby adjusting the volume of the air introduced into the engine 1. If a heat-insulating gas layer is formed in the combustion chamber 17, the fuel-air equivalence ratio $\varphi$ of the entire gas is suitably set to be less than one (to prevent the fuel-air equivalence ratio $\varphi$ of the air-fuel mixture layer from locally exceeding one). Note that while the engine 1 is cold, the fuel-air equivalence ratio $\varphi$ of the entire gas in the combustion chamber 17 is brought closer to one than the ratio $\varphi$ while the engine 1 is warm. This makes the combustion temperature higher than the temperature while the engine 1 is warm.

While the engine 1 is cold, the interval between the first and second injections is set to be shorter than the interval while the engine 1 is warm. This increases the local fuel-air equivalence ratio of the air-fuel mixture layer and raises the combustion temperature.

In this manner, eliminating or thinning the heat-insulating gas layer while the engine 1 is cold allows heat to be transferred from inside the combustion chamber 17 onto the wall surface of the combustion 17 (i.e., the transfer of the heat is not hampered unlike while the engine 1 is warm). In addition, the air-fuel mixture inside the combustion chamber 17 becomes more fuel-rich, and the interval between the first and second injections is shorter, than while the engine 1 is warm, thus increasing the local fuel-air equivalence ratio of the air-fuel mixture layer. This can raise the combustion temperature and promote warming up the engine 1.

When the temperature of the cooling water in the engine 1 reaches a predetermined temperature to complete warming up the engine 1, the engine controller 100 retards the fuel injection timing with respect to the timing while the engine 1 is cold, as shown in the top graph in FIG. 4. In this manner, an air-fuel mixture layer and a heat-insulating gas layer, surrounding the air-fuel mixture layer, are formed with reliability in the combustion chamber 17 (see FIG. 2). In addition, setting the fuel-air equivalence ratio $\varphi$ of the entire gas in the combustion chamber 17 to be smaller than the ratio while the engine 1 is cold to make the air-fuel ratio leaner allows the combustion temperature to be lowered. Thus, while the engine 1 is warm, the thermal efficiency is improved by reducing the cooling loss.

As can be seen, the engine controller 100 changes the fuel injection mode according to the degree of activation of the catalyst converter 192 and the temperature level of the engine 1. Specifically, if the engine 1 is started while the catalyst converter 192 is inactive and the engine 1 is cold, first, the heat-insulating gas layer is thickened to attempt to activate the catalyst converter 192, and then thinned to promote warming up the engine 1. Once the engine 1 has been warmed up, the heat-insulating gas layer will be thickened again to attempt to reduce the cooling loss.

According to the configuration described above, while the catalyst converter 192 is active and the engine 1 is cold, the heat-insulating gas layer in the combustion chamber 17 is either eliminated or thinned. Alternatively, an air-fuel mixture layer may be provided in the vicinity of the wall surface of the combustion chamber 17 and a layer that is more fuel-lean than the air-fuel mixture layer may be provided in the central region of the combustion chamber 17, for example. Adopting such a so-called "reverse layering" allows the air-fuel mixture to burn in the vicinity of the wall surface of the combustion chamber 17, thus further promoting the transfer of heat from inside the combustion chamber 17 onto the wall surface of the combustion chamber 17. Such reverse layering can be implemented by appropriately adjusting the injection mode (including the injection timing, the lift amount, and the injection period) of the fuel into the combustion chamber 17.

While the catalyst converter 192 is inactive, the fuel injection mode described above may be modified by combination of any of various measures to be described below, in order to further activate the catalyst converter 192. Alternatively, the fuel injection mode described above may even be replaced with any of various measures described below. For example, to increase the heat flux going toward the exhaust side, the idle engine speed of the engine 1 may be increased to increase the exhaust flow rate. Alternatively, if the air-fuel mixture is difficult to ignite, an ignition assist system 56 may be operated to ignite the air-fuel mixture with reliability. Still alternatively, instead of reducing the volume of the air introduced into the cylinder 11 as described above, increasing the degree of opening of the throttle valve 55 or setting the valve closing timing of the intake valve 21 in the vicinity of the intake bottom dead center may be adopted to increase the loading weight and the flow rate of the exhaust gas.

Still alternatively, the valve opening timing of the exhaust valve 22 may also be advanced to further raise the temperature of the exhaust gas. Furthermore, the air-fuel mixture layer may also be formed in the combustion chamber 17 to have a relatively rich air-fuel ratio in a region closer to the exhaust passage to allow the high-temperature exhaust gas to be exhausted quickly and supplied to the catalyst converter 192.

Also, if the catalyst converter 192 is inactive and the temperature has exceeded a predetermined temperature, the fuel injection timing may be further retarded to delay the combustion end timing and further raise the temperature of the exhaust gas. Optionally, instead of reducing the volume of the air introduced into the cylinder 11, the amount of the fuel injected may be increased to set the local fuel-air equivalence ratio $\varphi$ in the air-fuel mixture layer to be equal to or greater than one.

While the catalyst converter 192 is active and the engine 1 is cold, the fuel injection mode described above may be modified by combination of any of various measures to be described below, in order to further promote warming up the engine 1. Alternatively, the fuel injection mode described above may even be replaced with any of various measures described below. For example, the flow velocity may be increased in the vicinity of the wall surface of the combustion chamber 17 to produce a swirl inside the cylinder 11 in order to promote the transfer of heat from inside the combustion chamber 17 onto the wall surface of the combustion chamber 17. Note that if a heat-insulating gas layer is formed while the engine 1 is warm and/or while the catalyst converter 192 is inactive, the gas flow inside the combustion chamber 17 is suitably weak as described above. Optionally, the fuel injection timing may be further advanced to accelerate the combustion timing. Also, the combustion timing by CAI may be accelerated by increasing the effective compression ratio with the valve closing timing of the intake valve 21 set in the vicinity of the intake bottom dead center.

Furthermore, to raise the temperature of the air introduced into the cylinder 11, the flow rate of the air passing through an inter warmer provided for the intake passage 181 may be increased. Furthermore, in an engine with a supercharger, the flow rate of the air being bypassed through an inter cooler may be increased to raise the temperature of the air introduced into the cylinder 11.

Note that while the engine 1 is warm, while the engine 1 is cold, and while the catalyst converter 192 is inactive, the second injection may be comprised of multi-stage injections including a plurality of injections as shown in FIG. 9. As described above, the fuel injection valve 6 including a piezoelectric element is highly responsive, and can provide multi-stage injections, e.g., twenty-time injections during a period of 1-2 msec. Even if the second injection is implemented as multi-stage injections, the spray of the fuel injected also reaches the vicinity of the fuel injection valve 6 and approaches the injection axis S of the fuel injection valve 6 as shown in FIG. 5. In the example illustrated in FIG. 9, the interval between respective fuel injections that form the second injection is substantially equal to zero. Alternatively, a predetermined interval may be provided between the fuel injections.

In the example described above, an outwardly-opening fuel injection valve is adopted as the fuel injection valve 6. However, the fuel injection valve 6 applicable for use in the present disclosure does not have to be such an outwardly-opening fuel injection valve. For example, a valve covered orifice (VCO) nozzle type injector can also change the effective cross-sectional area of the injection nozzle orifice by adjusting the degree of cavitation produced at the nozzle orifice. Consequently, even if the fuel injection mode shown in FIG. 4 or 9 is adopted, an air-fuel mixture layer can also be formed in the central region of the cavity 163, a heat-insulating gas layer may be formed around the air-fuel mixture layer, and an excessively dense air-fuel mixture can also be substantially prevented from being formed locally in the same way as in the outwardly-opening fuel injection valve.

In the example described above, a heat shield structure is adopted for the combustion chamber and the intake ports and a heat-insulating gas layer is formed inside the combustion chamber. However, the present disclosure is also applicable to an engine that does not adopt such a heat shield structure.

DESCRIPTION OF REFERENCE CHARACTERS

1 Engine (Engine Body)
100 Engine Controller (Fuel Injection Control Unit)
11 Cylinder
12 Cylinder Block
13 Cylinder Head
16 Piston
17 Combustion Chamber
192 Catalyst Converter (Catalyst Device)
55 Throttle Valve (Air Volume Adjuster)
510 EGR System (Air Volume Adjuster)
6 Fuel Injection Valve

The invention claimed is:

1. A fuel injection control device for a direct injection engine, the control device comprising:
an engine body including a combustion chamber defined by a cylinder head ceiling portion, a cylinder provided for a cylinder block, and a piston reciprocating inside the cylinder; and
a fuel injection control unit which includes a fuel injection valve, provided inside the combustion chamber to inject a liquid fuel, and which is configured to inject the fuel into the combustion chamber at a predetermined timing, wherein
the fuel injection control unit is configured to
inject the fuel in a predetermined injection mode into the combustion chamber such that while the engine body is in a warm state where the temperature of the engine body has reached or exceeded a predetermined temperature, an air-fuel mixture layer and a heat-insulating gas layer, surrounding the air-fuel mixture layer, are formed in the combustion chamber at a point in time when an air-fuel mixture ignites,
change the injection mode of the fuel into the combustion chamber such that while the engine body is in a cold state where the temperature of the engine body is less than the predetermined temperature, the lower the temperature of the engine body is, the thinner the heat-insulating gas layer becomes,
the fuel injection control unit performs discrete injections including a plurality of fuel injections, and
sets an interval between two successive injections of the discrete injections to be shorter while the engine body is cold than while the engine body is warm.

2. The fuel injection control device for the direct injection engine of claim 1, further comprising
a catalyst device arranged on an exhaust passage of the engine body and configured to purify an exhaust gas exhausted from the combustion chamber, wherein
the fuel injection control unit is configured to
change the injection mode of the fuel into the combustion chamber such that while the catalyst device is active and the engine body is cold, the lower the temperature of the engine body is, the thinner the heat-insulating gas layer becomes, and
inject the fuel in a predetermined injection mode into the combustion chamber such that the heat-insulating gas layer becomes thicker while the catalyst device is inactive and the engine body is cold than while the catalyst device is active and the engine body is cold.

3. The fuel injection control device for the direct injection engine of claim 2, wherein
the fuel injection control unit is configured to
retard an injection start timing of the fuel to a predetermined timing such that while the catalyst device is inactive and the engine body is cold, the heat-insulating gas layer thickens, and
advance the injection start timing of the fuel while the catalyst device is active and the engine body is cold with respect to the injection start timing while the catalyst device is inactive and the engine body is cold.

4. The fuel injection control device for the direct injection engine of claim 3, further comprising
an air volume adjuster configured to adjust the volume of air introduced into the cylinder, wherein
the air volume adjuster decreases the volume of the air introduced into the cylinder, and thereby brings a fuel-air equivalence ratio of a gas in the combustion chamber closer to one, while the catalyst device is inactive and the engine body is cold than while the engine body is warm.

5. The fuel injection control device for the direct injection engine of claim 2, further comprising
an air volume adjuster configured to adjust the volume of air introduced into the cylinder, wherein the air volume adjuster decreases the volume of the air introduced into the cylinder, and thereby brings a fuel-air equivalence ratio of a gas in the combustion chamber closer to one, while the catalyst device is inactive and the engine body is cold than while the engine body is warm.

6. The fuel injection control device for the direct injection engine of claim 5, wherein while the catalyst device is inactive and has a temperature exceeding a predetermined temperature, the air volume adjuster sets the fuel-air equivalence ratio of the air-fuel mixture layer to be equal to or greater than one and sets the fuel-air equivalence ratio of the entire gas in the combustion chamber to be either equal to one or closer to one than when the temperature of the catalyst device is equal to or lower than the predetermined temperature.

7. The fuel injection control device for the direct injection engine of claim 6, wherein the air volume adjuster decreases the volume of the air introduced into the cylinder by introducing a burned gas into the cylinder.

8. The fuel injection control device for the direct injection engine of claim 5, wherein the air volume adjuster decreases the volume of the air introduced into the cylinder by introducing a burned gas into the cylinder.

9. A fuel injection control device for a direct injection engine, the control device comprising:

an engine body including a combustion chamber defined by a cylinder head ceiling portion, a cylinder provided for a cylinder block, and a piston reciprocating inside the cylinder;

a fuel injection control unit which includes a fuel injection valve, provided inside the combustion chamber to inject a liquid fuel, and which is configured to inject the fuel into the combustion chamber at a predetermined timing; and a catalyst device arranged on an exhaust passage of the engine body and configured to purify an exhaust gas exhausted from the combustion chamber, wherein the fuel injection control unit is configured to inject the fuel in a predetermined injection mode into the combustion chamber such that while the engine body is in a warm state where the temperature of the engine body has reached or exceeded a predetermined temperature, an air-fuel mixture layer and a heat-insulating gas layer, surrounding the air-fuel mixture layer, are formed in the combustion chamber at a point in time when an air-fuel mixture ignites, change the injection mode of the fuel into the combustion chamber such that while the engine body is in a cold state where the temperature of the engine body is less than the predetermined temperature, the lower the temperature of the engine body is, the thinner the heat-insulating gas layer becomes, retard an injection start timing of the fuel to a predetermined timing such that while the catalyst device is inactive and the engine body is cold, the heat-insulating gas layer thickens, and advance the injection start timing of the fuel while the catalyst device is active and the engine body is cold with respect to the injection start timing while the catalyst device is inactive and the engine body is cold.

10. A fuel injection control device for a direct injection engine, the control device comprising:

an engine body including a combustion chamber defined by a cylinder head ceiling portion, a cylinder provided for a cylinder block, and a piston reciprocating inside the cylinder; and a fuel injection control unit which includes a fuel injection valve, provided inside the combustion chamber to inject a liquid fuel, and which is configured to inject the fuel into the combustion chamber at a predetermined timing, wherein the fuel injection control unit is configured to inject the fuel in a predetermined injection mode into the combustion chamber such that while the engine body is in a warm state where the temperature of the engine body has reached or exceeded a predetermined temperature, an air-fuel mixture layer and a heat-insulating gas layer, surrounding the air-fuel mixture layer, are formed in the combustion chamber at a point in time when an air-fuel mixture ignites, and change the injection mode of the fuel into the combustion chamber such that while the engine body is in a cold state where the temperature of the engine body is less than the predetermined temperature, the lower the temperature of the engine body is, the thinner the heat-insulating gas layer becomes, the fuel injection control unit performs discrete injections including a plurality of fuel injections, and sets an interval between two successive injections of the discrete injections to be shorter while the engine body is cold than while the engine body is warm.

\* \* \* \* \*